United States Patent [19]
Litman

[11] 3,784,278
[45] Jan. 8, 1974

[54] NIGHT VISION DEVICE WITH VIEWING ACCESSORIES

[75] Inventor: Alan Litman, Pittsburgh, Pa.

[73] Assignee: General Ordnance Equipment Corporation, Pittsburgh, Pa.

[22] Filed: May 19, 1972

[21] Appl. No.: 254,972

[52] U.S. Cl. .................... 350/10, 350/18, 350/19
[51] Int. Cl. ............................................ G02b 23/16
[58] Field of Search .................. 350/10, 9, 18, 19, 350/38, 39; 250/213 VT, 83.3 HP; 95/48, 49

[56] References Cited
UNITED STATES PATENTS
2,679,197   5/1954   De Francisco .......................... 95/49
2,946,255   7/1960   Bolay ................................. 350/9 X
2,937,584   5/1960   Gesualdi ........................... 350/19 X

*Primary Examiner*—David H. Rubin
*Attorney*—Patrick J. Walsh

[57] ABSTRACT

This invention relates to a passive night vision device fitted with interchangeable viewing accessories such as oculars and cameras for still photography, television, or cinematography.

1 Claim, 7 Drawing Figures

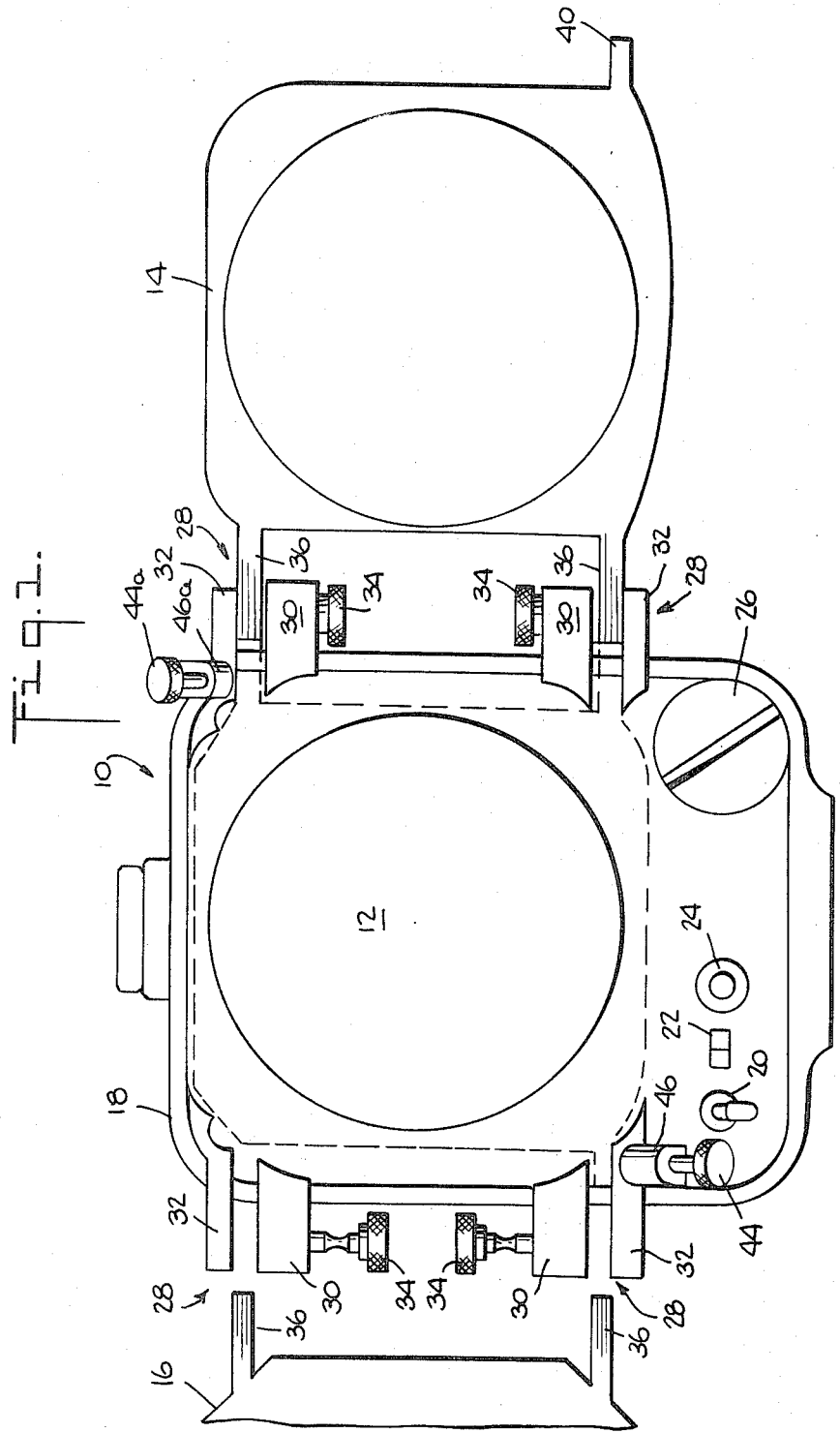

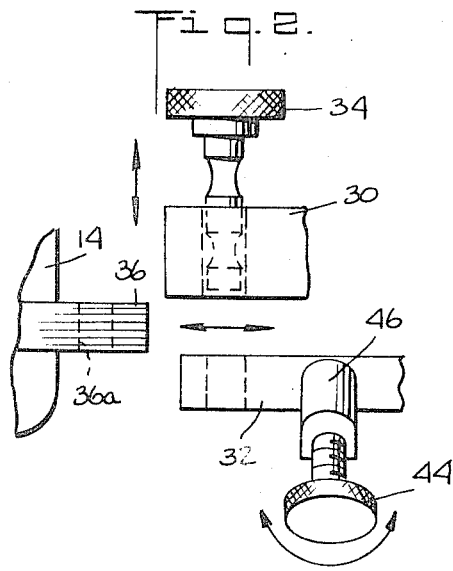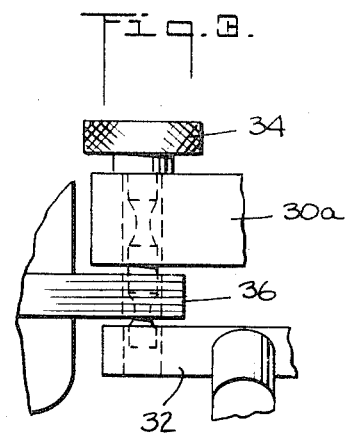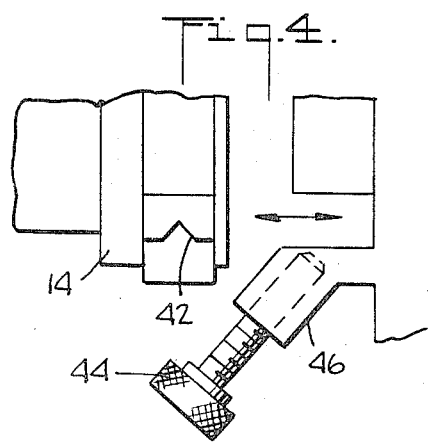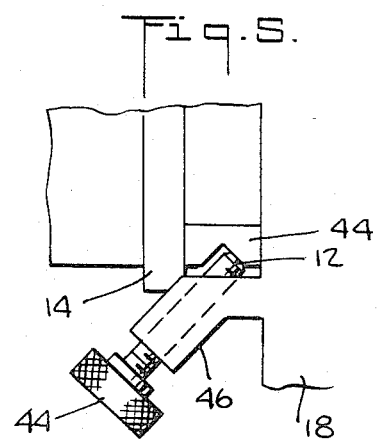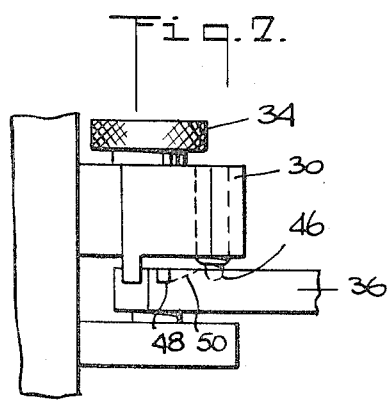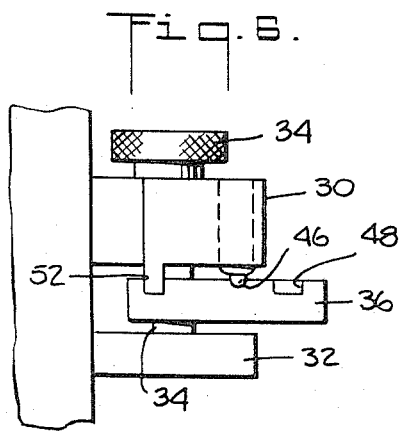

NIGHT VISION DEVICE WITH VIEWING ACCESSORIES

The present invention relates to night vision devices and more particularly to an arrangement for fastening viewing accessories at the output end of a night vision device.

A passive night vision device functions to intensify available light and to produce a visible image at its output end. Such devices are particularly useful for law enforcement purposes where it is necessary for law enforcement officials to maintain surveillance under conditions of darkness. The night vision device will enable a law enforcement officer to see a subject under conditions of darkness, where the subject would not be seen by the naked eye.

Viewing accessories such as oculars or eyepieces of various focal lengths as well as relay lenses for television, cinematography or still photography purposes have been used at the output end of night vision devices.

When employed in practice, night vision equipment is often used for surveillance over long periods of time. Therefore, it is most desirable for an ocular or eyepiece to allow easy vision without inconvenience or discomfort to the user. As an example, a biocular type eyepiece permits the viewer to position himself comfortably and to view the subject with both eyes so as to remain alert over an extended surveillance period. Biocular eyepieces provide a large exit pupil and long eye relief, permitting viewing from an angle off the optical axis and from a distance of up to three feet from the eyepiece. The design of biocular eyepieces is limited to comparatively long focal lengths providing a low order of magnification of the subject. In a typical surveillance situation many hours of surveillance may be rewarded by having a suspect appear within the field of view. At this point in the surveillance situation it is desirable to change oculars to an eyepiece having a shorter focal length, lower eye relief which provides a higher magnification of the subject's features for easier recognition. Or it may be desirable to remove the biocular eyepiece and replace it with a camera attachment.

The present invention provides for a night vision device having various viewing accessories which may be readily interchanged to suit the needs of a particular surveillance situation. The present invention provides for mounting alternate viewing accessories on opposite sides of the night vision device to be easily and readily positioned without loss of time in selecting the components and without being handicapped if the surveillance is being conducted under conditions of darkness. Alternate viewing accessories according to the present invention, may be quickly indexed into the use position in total darkness for immediate use by the surveillance officer.

It is an object of the present invention to provide a night vision device having alternate viewing accessories mounted on the device for being readily positioned according to the immediate demands of a surveillance situation. Another object of the present invention is to provide a night vision device with viewing accessories suitable for long periods of surveillance without fatigue to the surveillance officer and for interchanging viewing acessories so that lower or higher magnification of the subject may be achieved according to the demands of the surveillance situation.

Other and further objects of the present invention will be understood from the specification drawings and claims or will occur to one upon employment of the invention in practice.

A preferred embodiment of the invention has been chosen for description purposes and is shown in the accompanying drawing forming a part of the specification wherein:

FIG. 1 is a front elevation view of a night vision device showing alternate viewing accessories mounted on opposite sides of the night vision device;

FIG. 2 is a fragmentary view in front elevation showing the mounting and clamping means used for viewing accessories;

FIG. 3 is a view in front elevation corresponding to FIG. 2 in which a viewing accessory is fitted into mounted position with respect to the night vision device;

FIGS. 4 and 5 are in front elevation and illustrate sequentially a portion of the mounting arrangement for securing a viewing accessory in a use position;

FIGS. 6 and 7 are in rear elevation and illustrate detent means in sequential positions for retaining a viewing accessory in a standby position.

Referring now to the drawings and more particularly to FIG. 1, the present invention includes a night vision device 10 having a reticle 12 at which a light intensified image is delivered for further conditioning with alternate viewing accessories 14, 16. For example, the image delivered at the reticle may be further magnified by a binocular viewer 14 or received by a camera attachment 16 (shown partially broken away) including cameras for television, still photography or cinematography. The night vision device includes a casing 18 fitted with the usual devices including an on/off switch 20, a battery condition meter 22 and a battery test button 24. A battery cap 26 covers and retains an operating battery within the night vision device.

On either side of the casing there are mounting brackets 28 for receiving viewing accessories. Each of the mounting brackets includes the spaced pairs of projections 30, 32 having a slidable retaining pin 34 therein for receiving and retaining a viewing attachment. Each viewing attachment has spaced arms 36 which register with the projections 30, 32 for mounting on the night vision device. As best shown in FIGS. 2 and 3, the mounting arms 36 of a viewing accessory register with the spaces 38 between projections and receive the retaining pin through a suitable opening 36a for hingeably mounting the viewing accessory with respect to the night vision device.

As best shown in FIGS. 1, 4, and 5, each viewing accessory is fitted with a locking bar 40 having a V-shaped notch 42. For viewing accessory 14 the V-shaped notch is in the lower face of the locking bar so as to cooperate with an upwardly oriented thumb screw 44. The thumbscrew 44 cooperates with the locking bar 40 to position the viewing accessory 14 precisely with respect to the reticle 12 or object plane of the night vision device. This insures repeatability of a preestablished focal point and permits a biocular eyepiece or camera attachment to be very accurately located with respect to the reticle. It is to be understood that a viewing accessory be mounted to the left of the night vision device as shown in FIG. 1 and may be moved into position where the upper thumbscrew 44a cooperates with a corresponding locking bar and V- notch precisely to position the viewing accessory with respect to the object plane of the night vision device. Each thumbscrew is carried by a suitable threaded housing 46 and 46a.

Each of the lower brackets 28 are fitted with a ball detent 46 (FIGS. 6 and 7) which cooperates with each viewing accessory for holding the accessory in the standby position. It is to be noted that FIGS. 6 and 7 are views from the rear of brackets 30 compared with a view from the front as in FIG. 1. The upper projection 30 of the lower bracket receives the ball detent 46 which projects into the path traveled by mounting arm 36 as the viewing accessory moves from the use to a standby position. The arm 36 is notched at 48 to receive and to engage the ball detent and ultimately to bring the viewing attachment to a rest position. As shown in FIG. 6, the mounting arm 36 holds the viewing accessory in the use position. When the accessory is swung out of the use position to the standby position, the ball detent 46 registers with a recess 48 having a cam surface 50 which brings the viewing attachment to rest. In addition, a stop 52 engages and limits the rearward movement of arm 36.

To change from one accessory to another, such as to move a biocular eyepiece out of position and to swing a camera attachment or a high magnification eyepiece into position, it is necessary to loosen the captive thumbscrews and swing the accessory until it clicks into the ready position. The accessory to be used is swung out of the ready position at the opposite side and is moved into the use or mount position clamped with the captive thumbscrew. In order to change accessories, it is merely necessary to manipulate the retractable pins and mount the desired viewing attachment. What is claimed is:

1. A night vision device having a casing, a reticle mounted on said casing for receiving and displaying an image, first and second sets of mounting brackets located along opposed marginal edges of said casing and having the reticle located therebetween, each mounting bracket set having two pairs of cooperating spaced projections, a first viewing accessory having spaced mounting arms to register with said mounting bracket sets, means for pivotally mounting said accessory on said one set for movement between standby and use positions, a second viewing accessory having spaced mounting arms to register with the projections of the other of said bracket sets, means for pivotally mounting said second accessory on the other set for movement between standby and use positions, said first and second viewing accessories each having a locking arm for precisely positioning its respective accessory in operative relation to said reticle, and each of said mounting brackets have detent means for retaining each viewing accessory in standby position.

\* \* \* \* \*